United States Patent [19]

Rowe

[11] Patent Number: 6,076,030
[45] Date of Patent: *Jun. 13, 2000

[54] LEARNING SYSTEM AND METHOD FOR OPTIMIZING CONTROL OF AUTONOMOUS EARTHMOVING MACHINERY

[75] Inventor: Patrick S. Rowe, Pittsburgh, Pa.

[73] Assignee: Carnegie Mellon University, Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/173,074

[22] Filed: Oct. 14, 1998

[51] Int. Cl.$^7$ ...................................................... G06F 19/00
[52] U.S. Cl. .............................. 701/50; 701/207; 37/414; 172/4.5
[58] Field of Search ........................ 701/50, 207; 37/348, 37/414; 172/4.5

[56] References Cited

U.S. PATENT DOCUMENTS 5,631,658   5/1997   Gudat ....................................... 342/457

OTHER PUBLICATIONS

P. Rowe & A. Stentz, Parameterized Scripts for Motion Planning, Proceeding of the International Conference on Intelligent Robots & Systems, vol. 2, pp. 1119–1125, Sep. 10, 1997.

P.J.A. Lever & F. Wang, Intelligent Excavator Control System for Lunar Mining System, Journal of Aerospace Engineering, vol. 8, No. 1, 1995.

X. Shi, P. Lever & F. Wang, Experimental Robotic Excavation with Fuzzy Logic & Neural Networks, Proceedings of the International Conference on Robotics & Automation, 1996.

S. Singh, Learning to Predict Resistive Forces During Robotic Excavation, Proceedings of the International Confrence on Robotics & Automation, 1995.

B. Song & A.J. Koivo, Neural Adaptive Control of Excavators, Proceedings of the International Conference on Intelligent Robots & Systems, vol. 1, pp. 162–167, 1995.

*Primary Examiner*—William A. Cuchlinski, Jr.
*Assistant Examiner*—Arthur D. Donnelly
*Attorney, Agent, or Firm*—Blackwell Sanders Peper Martin

[57] ABSTRACT

In one embodiment of the present invention, a motion planning algorithm is used to control an autonomous machine. The motion planning algorithm consists of a template or script which captures the general trends of the motion, while parameters in the script are filled in with the kinematic details for a specific machine and set of movements. A learning algorithm computes the script parameters by using feedback of how the machine performed during the preceding cycle with the current parameter set, and adjusting the parameters to improve the machine's performance during succeeding work cycles. The new parameters are evaluated by the learning algorithm using a predictive function approximator to test various performance criteria such as the time required to perform a task and the accuracy with which the task was performed. The performance criteria are weighted using local regression techniques so that the prediction of the outcome of alternate motions places emphasis on the performance criteria that is considered most important. As data from repeated motions accumulates, the algorithm uses the history of the results of various motions to recompute and refine the parameters to improve performance.

15 Claims, 2 Drawing Sheets

LEARNING SYSTEM AND METHOD FOR OPTIMIZING CONTROL OF AUTONOMOUS EARTHMOVING MACHINERY

TECHNICAL FIELD

This invention relates generally to a system and method for controlling movement of robotic machinery, and more particularly, to a learning algorithm for modifying control parameters of robotic machinery during earthmoving operations.

BACKGROUND ART

Certain types of machinery perform repetitive motions during operations, such as a hydraulic excavator which performs repeated motions such as digging and loading during earthmoving operations. Currently, development of systems to automate control of earthmoving and other types of machinery is underway to alleviate the need for human operators and to accomplish tasks as quickly and precisely as possible. As used in this patent specification the phrase "earthmoving machine" and various approximations thereof refer to excavators, wheel loaders, track-type tractors, compactors, motor graders, agricultural machinery, pavers, asphalt layers, and the like, which exhibit both (1) mobility over or through a work site, and (2) the capacity to alter the topography or geography of a work site with a tool or operative portion of the machine such as a bucket, shovel, blade, ripper, compacting wheel and the like.

There are systems currently developed for robotic machinery that "learn" during operations. The "learning" typically includes storing a series of steps for performing a function, such as digging and dumping, and repeating the steps as many times as instructed. The current learning functions are designed to replicate repetitive tasks to alleviate the need for an operator to perform the same task several times. Conditions at a work site may change frequently, however, making a programmed series of steps less efficient as the conditions change. For example, at an excavating site, the shape of the terrain at the dig face constantly changes, the amount and distribution of material in a truck bed changes as loads of material are added. Further, the characteristics of the material being excavated, for example, large boulders, rocks, gravel, loose sand, or sticky clay, may change as new layers of soil are exposed. A programmed series of steps that may be highly efficient at the beginning of a task may become less efficient as the work progresses.

A technical paper authored by B. Song and A. Koivo entitled "Neural Adaptive Control of Excavators", Proceedings of International Conference on Intelligent Robots and Systems, Vol. 1, pp. 162–167, discloses a control system having a feed-forward torque term to adjust the digging plan in response to changes in the texture of material being excavated. The torque term is computed by a neural network trained to compute the inverse dynamics of the excavator. Although the addition of the feed-forward torque term improved overall tracking and stability, neural networks require considerable computation time to train, but once trained, predictions are computed very quickly. An additional drawback with neural networks is that they must be retrained to incorporate information from new data, i.e. they do not easily adapt autonomously to changes in the environment.

Rule based systems for controlling operations at a dig site are also used as disclosed, for example, by D. Seward in "LUCIE—The Autonomous Robot Excavator", Industrial Robot International Quarterly, Vol. 19, No. 1, pp. 14–18. These systems typically require a large number of rules to deal with variable conditions during excavation, and the rules must be implemented prior to the start of operations. The systems do not have the ability to adjust the rules to handle unforeseen situations or to optimize motions based on past experience. It is also unclear how the parameters or thresholds in the rules are generated.

U.S. patent application Ser. No. 08/796,824, which is assigned to the same assignee as the present application, discloses an automated system and method for controlling movement of machinery using parameterized scripts. Different sets of script parameters may be chosen depending on the work mode or upon the occurrence of different events. The parameters of a motion, such as for a hydraulic excavator, are computed using inverse kinematics, joint velocity information, and various heuristics. Some of the heuristics are used to compute the parameters dealing with soil conditions. The angles between the moving components may be very different depending on characteristics of the excavated material, for example dry sand or wet mud, and a wrong angle may result in inaccurate soil placement. The equations which compute these parameters do not change unless they are reprogrammed in the system. Thus, if the excavator performs poorly because of a bad assumption or heuristic, then there is currently no way to rectify the performance without interrupting operation of the machine.

A system that is able to autonomously monitor the work progress and modify the programming during operations so that the machine performs efficiently over a wide range of digging and loading conditions is therefore desirable.

Accordingly, the present invention is directed to overcome one or more of the problems as set forth above.

DISCLOSURE OF THE INVENTION

In one embodiment of the present invention, a motion planning algorithm is used to control an autonomous machine. The motion planning algorithm consists of a template or script which captures the general trends of the motion, while parameters in the script are filled in with the kinematic details for a specific machine and set of movements. A learning algorithm computes the script parameters by using feedback of how the machine performed during the preceding cycle with the current parameter set, and adjusting the parameters to improve the machine's performance during succeeding work cycles. The new parameters are evaluated by the learning algorithm using a predictive function approximator to test various performance criteria such as the time required to perform a task and the accuracy with which the task was performed. The performance criteria are weighted so that the prediction of the outcome of alternate motions places emphasis on the performance criteria that are considered most important. As data from repeated motions accumulates, the algorithm uses the history of the results of various motions to recompute and refine the parameters to improve performance.

BEST MODE FOR CARRYING OUT THE INVENTION

Figure 1:
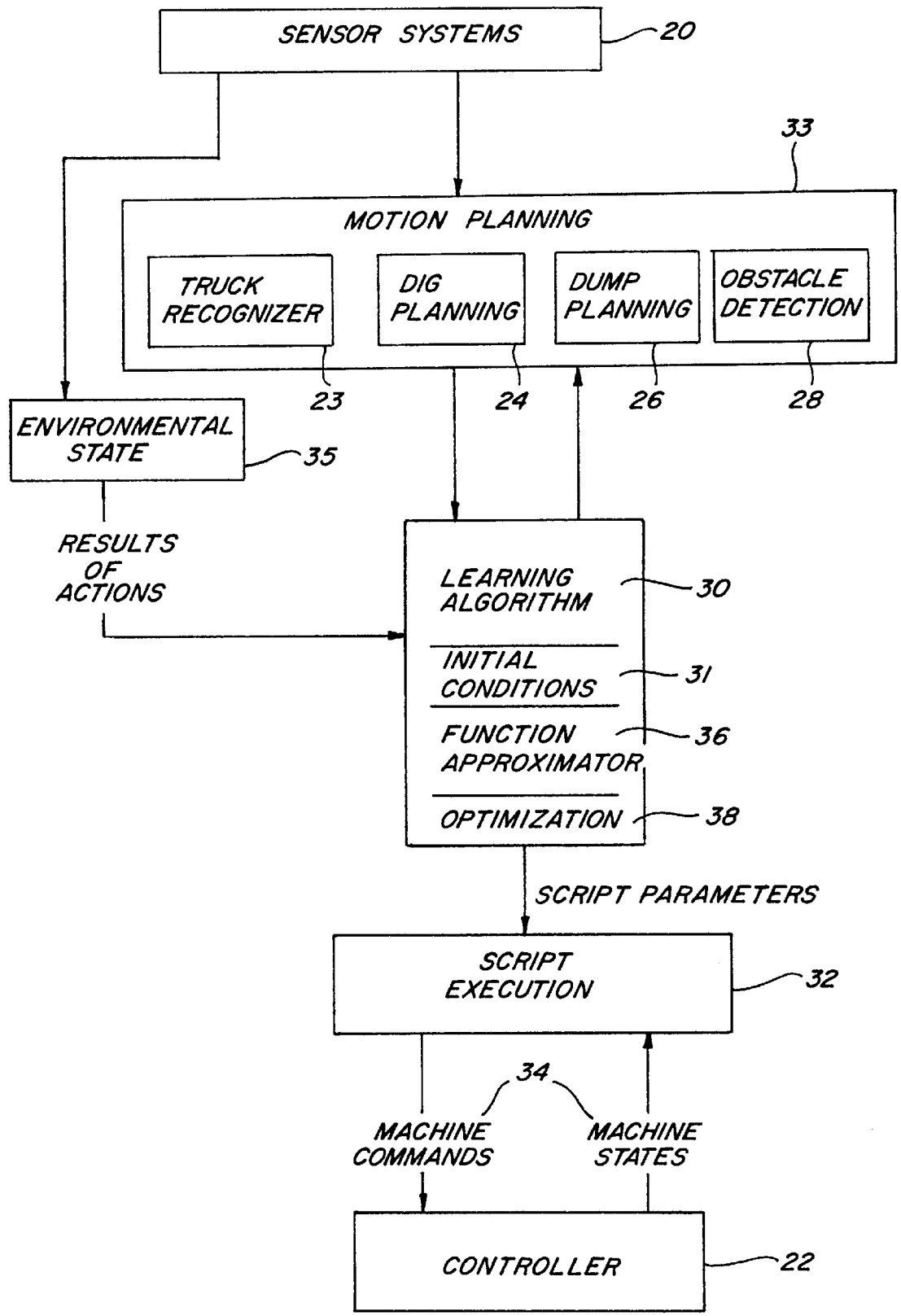
FIG. 1 is a flowchart of the motion planning scheme wherein the present learning algorithm is utilized.

Referring to the drawings, FIG. 1 shows several components in a preferred embodiment of the present invention including one or more sensor systems 20 that provide perceptual information regarding a machine's environment, for example, an excavation in an earthmoving environment. The information provided by the sensor systems 20 is processed by one or more software modules in a perception system 33 that are designed to extract a particular piece of information about the environment or provide a desired result for the machine's actions. In an earthmoving environment, for example, the perception system 33 may perform functions such as recognizing loading receptacles and determining their location and orientation 23, determining the desired area to be excavated 24, determining the desired area to unload the excavated material 26, and detecting obstacles 28. A learning algorithm 30 computes script parameters using past results of actions along with the processed information, as described hereinbelow. The parameters are used in scripts 32, which are templates that describe how to perform a certain task as a series of steps. The scripts 32 generate commands to the controllers 22 for positioning the movable components of the machine to accomplish required tasks.

The learning algorithm 30 uses the information provided by the perception system 33 about the current initial conditions 31 and the desired results for computing the next machine action. The initial conditions 31 may include any required information regarding the environment that is required to accomplish the task, such as the shape and location of the terrain excavation site, the dump truck height and location in which to load the excavated material, or the initial starting configuration of the machine itself. The desired results may pertain to any aspect of task performance such as a specific volume of soil captured per load, digging a maximum amount of soil in the minimum possible time, and/or the location for the bulk of the loaded material. The learning algorithm 30 returns a suggested action for the machine to take which it believes will best achieve the desired results given the current initial conditions.

The learning algorithm 30 initiates a query to the perception system 33 requesting initial conditions 31 about the environment and what outcome is desired. After the perception system 33 responds, the learning algorithm 30 returns a suggested action for the machine to take. The query may be split into separate portions, such as the initial state of the environment and the desired result for one action, such as digging, and another portion regarding the desired result for another action, such as the loading procedure. In this manner, the perception system 33 can formulate a response to the second query while the first action is performed. The initial conditions 31 may include any required information regarding the environment that is required to accomplish the task, such as the shape and location of the terrain excavation site, or the dump truck height and location in which to load the excavated material. The results of actions 35 may pertain to any aspect of task performance such as a specific volume of soil captured per load, digging a maximum amount of soil in the minimum possible time, and/or the location for the bulk of the loaded material. This environmental information and the desired results are available from the sensor systems 20 and the perception system 33 through the results of actions 35 data.

The optimization routine 38 of the learning algorithm 30 generates a suggested action for the excavator using the initial conditions 31, the desired results, and experience from past actions and results. The function approximator 36 is used by the optimization routine 38 to predict the outcome of a candidate action before it is attempted on the actual machine. The predicted outcome is then used to compute a cost for that candidate action which relates how closely the predicted outcome is to the desired outcome. The function approximation may be done in several ways, and the preferred embodiment utilizes a memory based learning model, where all previous machine actions are explicitly remembered over the course of a robotic machine's lifetime. One such memory based learning model is locally weighted regression. In locally weighted regression, points in a database are assigned a weight which is proportional to the distance of the points from the candidate action. Segments, or localities, of complex, nonlinear functions can be approximated by relatively simple algebraic models, such as linear or quadratic equations. An exponential weighting term is typically used and the coefficients for the local model of the data are computed using the weighted data. Weighting the data gives more effect to data points which are closer to the candidate action than those which are farther away. Segments of complex, nonlinear functions can therefore be approximated since weighting the local points of a segment allows different coefficients for different areas of the nonlinear function.

The database inputs, which are the candidate robot actions, and the outputs, which are the results of the robot actions, depend on the task itself. In the case of an autonomous excavator using parameterized scripts, the inputs or candidate actions are a set of script parameters. The outputs are the desired variables to optimize or improve, such as task execution time, machine efficiency, and/or accuracy in completing the task. The output variables are preferably measured for each work cycle using appropriate sensor systems.

Figure 2:
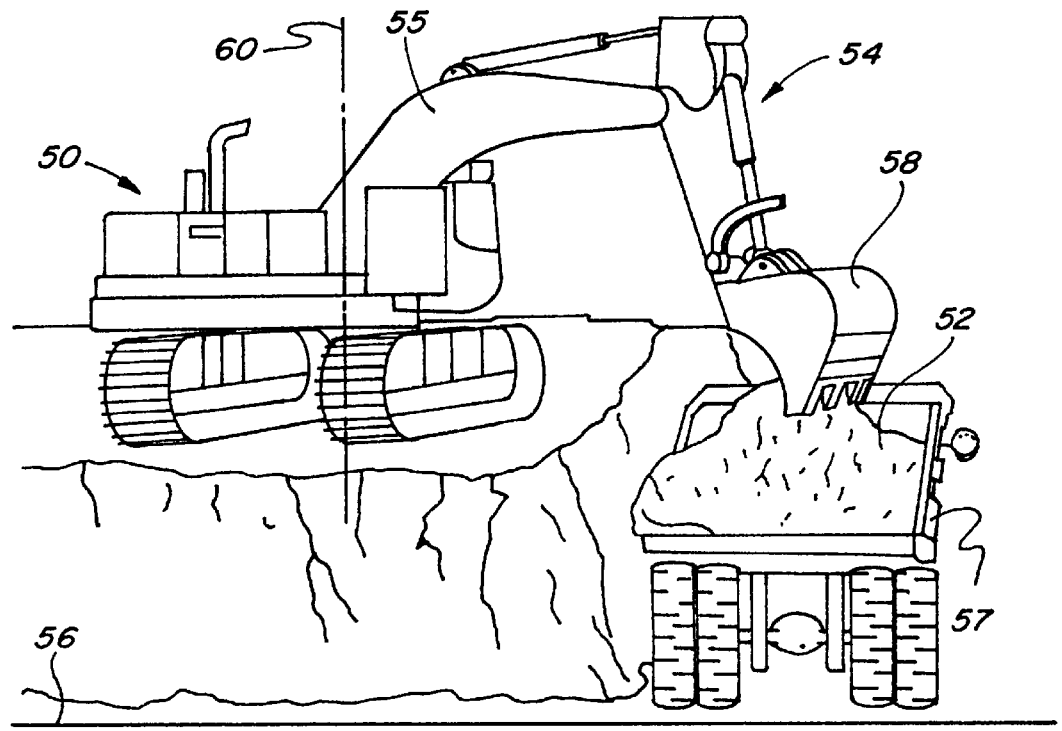
FIG. 2 is a perspective view of an excavator loading a truck.

By way of example, a simplified implementation of the learning algorithm 30 for an earthmoving machine, namely an excavator 50 as shown in FIG. 2, involves choosing a limited number of input and output variables for monitoring during performance of the task. In this example, the most relevant script parameters for the learning algorithm 30 to determine for an excavation work cycle were chosen to include:

- the angle between a boom 55 and a horizontal plane 56 which triggers swinging towards a truck 57;
- the angle of rotation about a swing axis 60 which triggers motion of a stick 54 for the dumping maneuver;
- the angle of rotation about the swing axis 60 which triggers when to begin opening the bucket 58;
- the angle between the stick 54 and the boom 55 which triggers when to begin opening the bucket 58;
- the angle between the stick 54 and the boom 55 for the first half of the dump;
- the angle between the stick 54 and the boom 55 for the second half of the dump; and
- the angle of the bucket 58 which triggers when the stick 54 should move from the first half to the second half dump position.

In the example implementation, the output variables recorded for each work cycle include the time (t) to complete the dumping motion, which begins immediately after digging is finished and ends when the excavator has dumped the dirt and has swung back to the dig site, and the location of a mound of dirt 52 in polar coordinates (r,θ) with respect to the excavator. Therefore, the output space is 3-dimensional and the input space is 7-dimensional, giving a total of 10 numbers which are stored in the database for each work cycle.

The optimization routine 38 generates an initial set of candidate script parameters. These candidate parameters are then evaluated by the function approximator which returns a predicted outcome of the action. This predicted outcome is used to compute a cost or score for performing the given candidate action. The cost information is then used by the optimization routine 38 to select a new set of candidate script parameters which have a lower cost or a better score. This process continues until the optimization routine 38 settles on one final set of script parameters.

The candidate set of script parameters used by the function approximator 36 are selected using the optimization component 38. There are several optimization routines that can be used in the optimization component 38 of the learning algorithm 30 in FIG. 1 to choose a candidate action. If the dimensionality of the action space is small enough, then a brute-force search over all actions at some finite resolution may be acceptable. In other instances, where the dimensionality is high, for example, above 4, some possibilities may be choosing actions at random, or perhaps making random alterations to the best previous actions. An interpolation approach may also be used which creates a new candidate action from a linear combination of previous actions in the data base. Another approach is to generate actions at random, and to use a notion of reliability of the predicted accuracy as a way to prioritize the actions. If the desired outcome can be expressed as a cost function which is to be minimized or maximized, then an algorithm such as gradient descent, as is well know in the art, can be used to select an action.

A preferred embodiment of the present invention utilizes the downhill simplex method as is well known in the art which uses a locally weighted linear regression function approximator 36 for each function evaluation made. The initial simplex is computed using some intelligence about the gradient at the starting point. Rather than adding a small value along each dimension of the input space, a value proportional to each term in the gradient (or negative gradient if minimization is desired) is added to the starting point. In this manner, if there is a very steep slope in one dimension of the input space, the corresponding simplex vertex might start further down the hill and lead more quickly to a minimum. The optimization routine may be started in several different locations if there are potential problems with local minima. The starting points are chosen to be the previous machine actions in the database which have the best performance, such as the lowest cost, lowest time, or lowest radial error.

Figure 3:
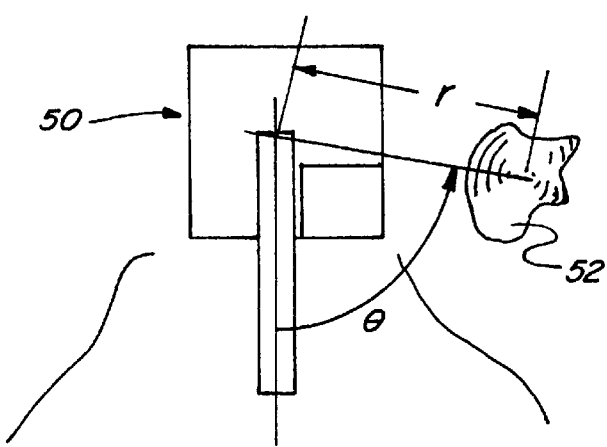
FIG. 3 is a top view of the position of an excavator, a dig face, and a pile of excavated material at a dig site with reference to a polar coordinate system.

The optimization component 38 is run until it reaches a minimum cost value. One example of a cost function that may be appropriate for the unloading phase of the mass excavation task is:

$$c = w_1 t + w_2 (loc_{des} - loc_{act})^2$$

where $w_1$ and $w_2$ are weight values on the different terms, and $loc_{des} - loc_{act}$ is the error between desired and actual location of the soil pile during the unloading phase of motion. For the situation shown in FIGS. 2 and 3, this cost function may be written as:

$$c = w_t t + w_r (r_{des} - r_{act})^2 + w_\theta (\theta_{des} - \theta_{act})^2.$$

where t is execution time, $r_{act}$ and $\theta_{act}$ are the actual radius and angle of the soil pile 52 with respect to a reference location on the excavation to the center of the soil pile as shown in FIG. 3, $r_{des}$ and $\theta_{des}$ are the desired coordinates of the soil pile 52. The $w_\theta$ in front of the tangential error term is a weight term used to dimensionalize and/or otherwise scale tangential error with respect to the radial error by using the equation $s = r\theta$ where s is the arc length in the tangential direction at radius r. This particular cost function is a linear combination of several output variables, namely execution time and the components of accuracy of the operation, such as radial position error, and tangential position error. These terms can be weighted with the adjustable weights based on what is deemed to be more important. For instance, the weights can be selected by determining how much 1 second of time is worth in units of distance, i.e., if $w_t = 2$ and $w_r = 400$, then 0.5 seconds of time would be equivalent to 5 centimeters of spatial error. The ability to adjust these weights allows a human supervisor to favor one criterion over the other depending on the nature of the task.

Examples of other criteria that could be included in the cost function are: the error between desired and actual volume of soil captured in the bucket during digging; machine efficiency in terms of power available versus power used; and a measure of smoothness of the motion, particularly if there are perception sensors mounted on the machine. With this technique, selecting an action to try on the robot is restated as an optimization problem. There are many techniques for optimization of a function which can be found in the prior art. In this approach, the learning system selects what it believes to be the best action to take given what it knows so far as opposed, for example, to random action.

The optimization routine 38 uses the function approximator 36 to predict the outcome of a candidate machine action, which is used to compute a score for that action. The function approximator 36 in this sample implementation uses a locally weighted linear regression algorithm to calculate the predicted outcomes. A weighting scheme is used in the preferred embodiment to put more emphasis on the previously stored parameters that are closer to the candidate parameters. The following weighting function is one of many which may be used:

$$w_i = e^{\frac{-D(x_i, input)}{K}}$$

where $w_i$ is the weight assigned to the ith set of parameters in the database and the index i varies from 1 to n, where n is the number of cycles for which data is recorded; $x_i$ is the ith data point, i.e., the set of parameters that was used when the data point was recorded; input is the set of one or more candidate parameters that are input to the function approximator 36 whose output is being predicted; K is the kernel width, which scales the exponential term; and D is a Euclidean distance function which returns the squared distance between input and the ith data point. Points very close to the input will receive a higher weight than points which are further away, and the kernel width affects the locality of the fit. Large kernel widths result in a more globally equal weighting of the data points, while a small kernel width tends to weight only the very closest data points. All of the inputs are normalized between 0 and 1 based on predetermined limits on the range of each input parameter before the weight is computed. This avoids having one data point with a very different scale dominate the distance calculation. For a database having a large amount of data, the number of cycles included in the calculation may be limited to a selected number. Additionally, intelligent data structures like k-d trees can be used to greatly speed up the data retrieval and weight computations.

Both the input and output terms of each data point get multiplied by the weights. One way to express this in matrix form is $$Z = WX$$

$$v = Wy$$

Assuming n data points in the database, and m terms for the input of each data point, then W is an n×n diagonal matrix of the weights, X is an n×m matrix of the input terms or parameters of each data point, and y is an n×1 vector of the output associated with each data point. In the case of multiple outputs, such as time and spatial accuracy, there would be several different y and v vectors, but the same weights would be used since they are a function of the distance between input terms. In order to solve the problem of not requiring the linear model to pass through the origin, an additional column of 1's is added to the matrix X, resulting in an n×m+1 matrix.

After the Z and v matrices are computed, the m+1 coefficients β of the linear model are found by solving $$Z\beta = v$$

In order to provide a numerically stable algorithm in the face of singular, or nearly singular matrices, a singular value decomposition algorithm is used to solve the above matrix equation for β. Different β vectors are computed for each prediction for each of the outputs.

Once β has been computed, the predicted output is $$y' = \beta^T \text{input}$$

One of the more important variables to select in the locally weighted linear regression technique is the kernel width K. This can be done automatically by means of cross validation. During cross validation, one or several data points are removed from the existing data base, and the "sub-data base" is queried with these extracted points. The error between the predicted answer and the actual answer is computed. In this way, the kernel width, K, that gives the lowest cross validation error can be selected.

Locally weighted linear regression has desirable properties including readily available gradient information, the ability to handle noisy data, and no local minima problems (as in neural networks), because the answer is computed analytically. More sophisticated regression algorithms, such as Bayesian regression, can also return confidence intervals on the predicted output and noise statistics. Quadratic regression algorithms may also be used if the functions are locally quadratic, as opposed to linear.

Once the next machine action is determined by the learning algorithm 30, the scripts 32 are filled in with the script parameters, the action is executed, and the results are measured and recorded. As this process of gathering more data continues, the script parameters are updated to improve performance of the machine. Several robot learning systems require a period of experimentation or "practice" in order to explore areas of the environment which may ultimately lead to more efficient operation. With the present invention, some initial calibration exercises may be performed before the task begins. For example, with an excavator, it is possible to experiment with the digging motion parameters and then dump the soil back in place after the practice is completed. The experimentation phase may also provide data that would be used in the event that the result of an action cannot be measured completely during operation. This may happen when the line of sight of a sensor system is occluded from the area of interest and the data is therefore noisy or missing. In this situation, data obtained during calibration may be used to fill in for the missing data.

If there is no history or database to rely on for starting or improving operations, as when a machine first enters service at a new location, one solution is to use data from past operations and/or machines and assume the environmental conditions are similar. Another approach is to have a human operator initially perform some work cycles and have the system record the relevant parameters and measured outcomes in the database. Another method is to start with an initial set of parameters that are calculated with machine models and heuristics. The initial parameters can then be improved upon once the learning algorithm takes over.

The present learning algorithm may also be combined with other motion control techniques such as rule based systems. This hybrid approach allows knowledge that applies to unchanging portions of a given task to be hard-coded into rules, and then parameters may be computed for portions of the task where learning can improve operational efficiency.

Industrial Applicability

The present invention can be applied to various types of construction and agricultural machinery. An example of a script for a hydraulic excavator is shown hereinbelow that was designed to (1) move around obstacles detected in the environment; (2) minimize the time for each bucket load by coupling joint motions between the stick 54, boom 55, bucket 58, and movement about swing axis 60 of the excavator 50 as shown in FIG. 2; and (3) minimize the spillage of earth on the ground around the truck during dumping. For this script, all of the parameters are joint angles. The numbers in bold font are the parameters that are recomputed for every bucket load. The parameters defined as commands are computed based on the geometry of the excavator. The parameters that appear in the rule part of each script step are the trigger parameters that are computed using dynamic information or heuristics.

Swing:

| | | |
|---|---|---|
| 1) | When digging finishes, wait | Command = 5° |
| 2) | When boom angle >14°, swing to truck | Command = 101° |
| 3) | When bucket angle >10°, swing to dig face | Command = −5° |
| 4) | When swing angle = 5°, stop to dig | Command = −5° |

Boom:

| | | |
|---|---|---|
| 1) | When digging finishes, raise boom | Command = 18° |
| 2) | When swing angle >60° and stick angle >−89°, begin dump procedure | Command = 16° |
| 3) | When bucket angle >−30°, continue to dump | Command = 18° |
| 4) | When swing angle <60°, lower boom to dig | Command = 14° |

Stick:

| | | |
|---|---|---|
| 1) | When digging finishes, wait | Command = −100° |
| 2) | When boom angle >31°, begin dump procedure | Command = −76° |
| 3) | When bucket angle >−30°, continue to dump | Command = −101° |
| 4) | When swing angle <65°, move to dig | Command = −85° |

Bucket:

| | | |
|---|---|---|
| 1) | When digging finishes, capture soil | Command = −90° |
| 2) | When swing angle >60° and stick angle >−89°, open bucket | Command = 30° |
| 3) | When swing angle <60°, move to dig | Command = 7° |

As an example of how to read the script, consider the first two steps of the swing's subscript. The script begins at step 1, when digging has completed, and the swing command associated with step 1 is 5°, which is the current swing angle. During this time, the boom angle is monitored as the boom 55 is raised. When the boom 54 passes a certain angle, in this case 14°, the script step switches from step 1 to step 2, and the swing joint command switches from 5° to 101°, which causes the excavator 50 to swing toward the designated dump location. The script continues to send this swing command until the conditions are satisfied to switch to step 3, and change the swing command again.

The learning algorithm will modify the parameters if it determines that a change will improve the efficiency of the operation as described hereinabove. The scripts can be applied to many different types of complex motion control in robotic systems where complex tasks can be broken down into a series of simple steps. Use of variable parameters in general instructions is an effective way to refine operations. Coupling movements of joints via parameters having values representing external conditions, including the occurrences of events as the result of the movement of other joints, and internal factors, such as power limitations, simplifies generation of the instructions or subscripts, and provides flexibility of operation.

Other aspects, objects and advantages of the present invention can be obtained from a study of the drawings, the disclosure and the appended claims.

I claim:

1. A method for controlling automated movement of an earthmoving machine having a plurality of links connected at joints that are operable to move concurrently based on commands generated using at least one script, each script including at least one variable parameter defining a movement of the machine, the method comprising the steps of:

determining at least one desired outcome from a number of desired outcomes;

measuring conditions in the machine's environment pertaining to each desired outcome;

determining a candidate value for at least one variable parameter from a number of potential candidate values using a learning algorithm before executing the script in which the variable parameter is used; and predicting the desired outcome of the candidate value prior to executing the script in which the variable parameter is used with the candidate value being selected based upon the determined desired outcome.

2. The method as set forth in claim 1 wherein the candidate value for each variable parameter is a predetermined value that is used during initial execution of at least one script, the method further comprising the steps of:

storing the measured conditions during at least one execution cycle; and storing the candidate value used for each variable parameter during at least one execution cycle.

3. The method as set forth in claim 2 wherein the learning algorithm comprises the step of:

executing a function approximator to evaluate each candidate value by predicting the outcome using at least one stored value for each variable parameter and at least one of the stored measured conditions from at least one execution cycle.

4. A method as set forth in claim 3 wherein the learning algorithm further comprises the step of:

optimizing a cost function that is dependent on at least one variable representing the desired outcome and at least one corresponding data value from the actual measured conditions.

5. The method as set forth in claim 4 wherein executing the function approximator further comprises the step of:

predicting the outcome of the machine action using a weighted regression algorithm, the weights being computed using an exponential function that is dependent on the difference between at least one stored variable parameter and the candidate value.

6. The method as set forth in claim 5 wherein the step of executing the function approximator includes using a locally linear function to approximate a segment of the response.

7. The method as set forth in claim 5 wherein the step of executing the function approximator includes using a locally quadratic function to approximate a segment of the response.

8. A system for controlling automated movement of a machine comprising:

a machine having a plurality of links connected at joints that are operable to move concurrently based on commands;

a processing system for executing at least one script, each script including at least one variable parameter defining a movement of the machine; and a learning algorithm operable to modify values of at least one variable parameter based on a desired outcome of the machine's action and conditions measured in the machine's environment pertaining to the desired outcome and predicting the desired outcome of the machine's action prior to executing movement of the machine with the desired outcome being selected based upon a number of desired outcomes.

9. The system as set forth in claim 8 wherein at least one candidate value for each variable parameter is a predetermined value that is used during initial execution of at least one script, the system further comprising:

data storage means for storing the measured conditions during at least one execution cycle and for storing the value used for each variable parameter during at least one execution cycle.

10. The system as set forth in claim 9 wherein the learning algorithm comprises:

a function approximator to evaluate the at least one candidate value for modifying at least one variable parameter by predicting the outcome using at least one stored value for each variable parameter and at least one of the stored measured conditions from at least one execution cycle.

11. The system as set forth in claim 10 wherein the learning algorithm further comprises:

a cost function that is dependent on at least one variable representing the desired outcome and at least one corresponding data value from the actual measured conditions.

12. The system as set forth in claim 11 wherein the function approximator further comprises:

a weighted regression algorithm for predicting the outcome of the machine action, the weights being computed using an exponential function that is dependent on the difference between at least one stored variable parameter and the candidate value.

13. The system as set forth in claim 12 wherein the function approximator further includes using a locally linear function to approximate a segment of the machine's response.

14. The system as set forth in claim 12 wherein the function approximator further includes using a locally quadratic function to approximate a segment of the machine's response.

15. The system as set forth in claim 8 further comprising at least one fixed instruction for controlling the movement of the machine.

* * * * *